United States Patent [19]

Chen

[11] Patent Number: 5,409,321

[45] Date of Patent: Apr. 25, 1995

[54] QUICK RELEASE CLAMP FOR A BICYCLE

[75] Inventor: Chao F. Chen, Taichung Hsien, Taiwan, Prov. of China

[73] Assignee: Kalloy Industrial Co., Ltd., Taiwan, Prov. of China

[21] Appl. No.: 104,765

[22] Filed: Aug. 12, 1993

[51] Int. Cl.$^6$ .................. B25G 3/18; F16B 21/00; F16D 1/00

[52] U.S. Cl. .................. 403/321; 403/322; 403/330

[58] Field of Search .................. 403/321, 322, 330

[56] References Cited

U.S. PATENT DOCUMENTS

| | | | |
|---|---|---|---|
| 2,896,751 | 7/1959 | Henrichs | 403/321 |
| 3,429,594 | 2/1969 | Stedfeld | 403/321 |
| 3,686,896 | 8/1972 | Rutter | 403/321 |
| 4,474,492 | 10/1984 | Fleitas | 403/322 |

Primary Examiner—Richard A. Bertsch
Assistant Examiner—Howard R. Richman
Attorney, Agent, or Firm—Parkhurst, Wendel & Rossi

[57] ABSTRACT

A quick release clamp includes a handle pivotally fixed on a U-shaped bracket via a pin. The U-shaped bracket has a central hole at a base therein and two plates integrally and perpendicularly extended from two sides of the base. A bolt device having a head portion and a rod portion is threadedly engaged with a nut by a lower end of the rod portion with the rod penetrating the hole of the U-shaped bracket and the head portion being slidably received in the U-shaped bracket. A transverse hole is formed in the head portion of the bolt device for receiving a middle portion of the pin. The pin has a recess formed at a middle portion thereof suitable to receive a peripheral portion of the transverse hole of the head portion of the bolt device. The pin is rotatable in concert with the handle thus allowing the bracket to be manually moved close to or away from the nut. Therefore an object secured between the bottom surface of the bracket and the top surface of the nut is allowed to be released by operating the handle.

4 Claims, 3 Drawing Sheets

5,409,321

QUICK RELEASE CLAMP FOR A BICYCLE

FIELD OF THE INVENTION

This invention relates to a quick release clamp for a bicycle.

BACKGROUND OF INVENTION

A conventional quick release clamp for a bicycle as shown in FIG. 5 comprises a handle 30 which has two ears 301 extending from one end thereof and having a predetermined distance between the two ears 301. Each ear 301 has a hole 301A being substantially "D" shaped. A bracket 40 is formed as a "U" shape structure having a disk base 43 and two parallel plates 41 perpendicularly extending from the disk base 43. A hole 42 is formed at the center of the disk base 43. Each plate 41 has a hole 41A formed therethrough. A bolt 50 has a head 51 which is formed with a hole 51A therethrough. The hole 51A has a first length in a longitudinal direction thereof. The head portion 51 of the bolt 50 is appropriately sized to be positioned between the two perpendicular plates 41, i.e., the two perpendicular plates 41 would not clamp the head portion 51 when the rod portion 52 is positioned through the hole 42 of the disk base 43. A pin 31 which is sectionally D shaped is appropriately sized to mate with the two holes 301A of the two ears 301. The handle 30 is pivotally fixed on the bracket 40 by means of the pin 31. It should be noted that the hole 51A of the bolt means 50, the holes 301A of the handle 30, and the holes 41A of the bracket 40 are appropriately sized such that they are allowed to be engaged in alignment with each other by means of the pin 31. The pin 31 has a recess 31A formed in a middle portion thereof which has a longitudinal length substantially greater than the first length of the hole 51A of the head portion 51 off the bolt means 50. The recess 31A is appropriately sized such that it can receive an inner peripheral portion of the hole 51A of the bolt means 50, yet not intersect with the holes of the bracket 40. The pin 32 is longitudinally formed with a threaded hole 32 allowing to firmly receive a screw 33.

In the above quick release, the bracket 40 requires a great deal of machining on the disk base 43 and thus incurs relatively high cost in manufacturing.

It is requisite to provide an improved quick release clamp which can save cost in manufacturing.

SUMMARY OF THE INVENTION

It is an object of the present invention to provide an improved quick release clamp which is easily manufactured compared to the conventional one.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
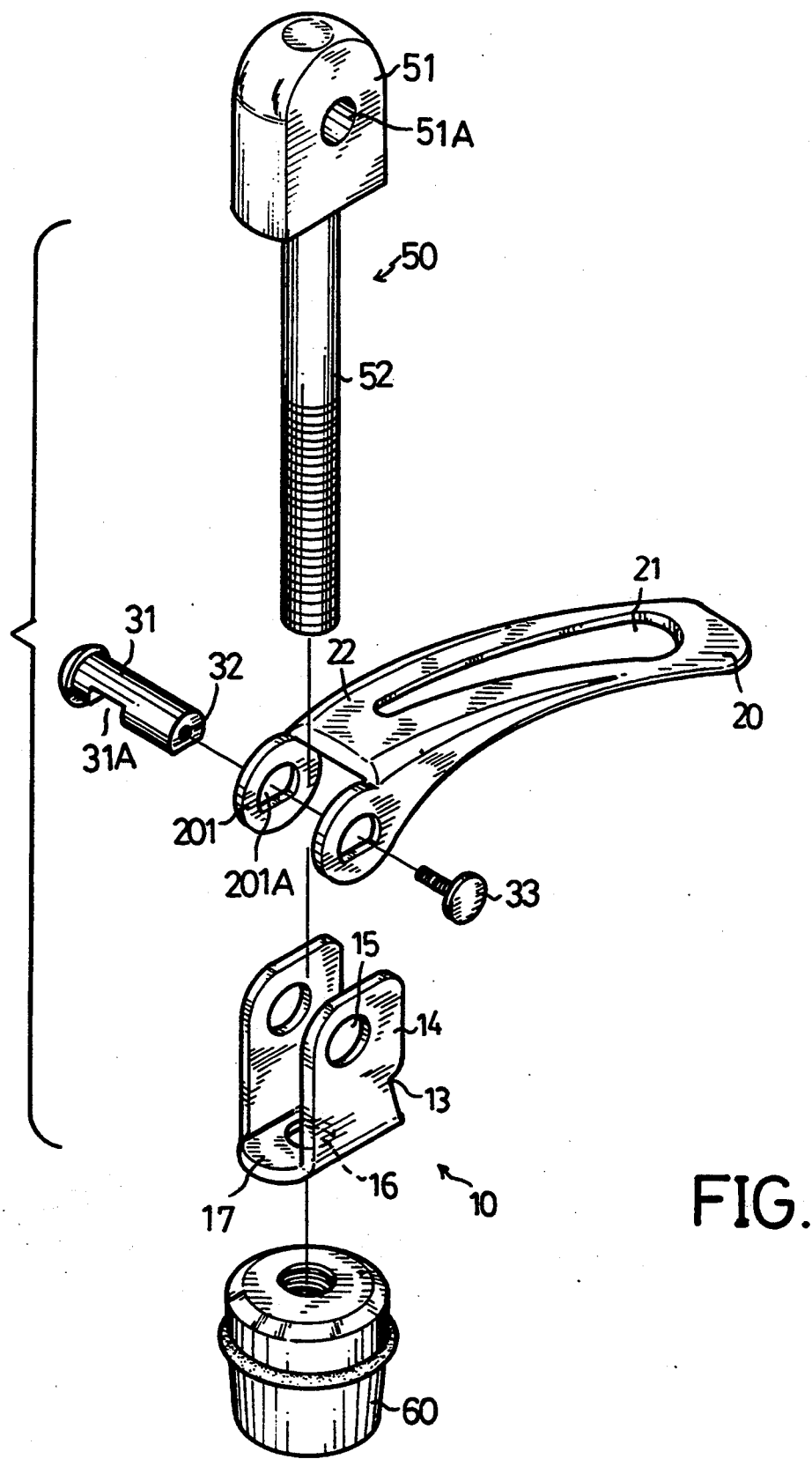
FIG. 1 is an exploded view of a quick release clamp in accordance with the present invention.
Figure 5:
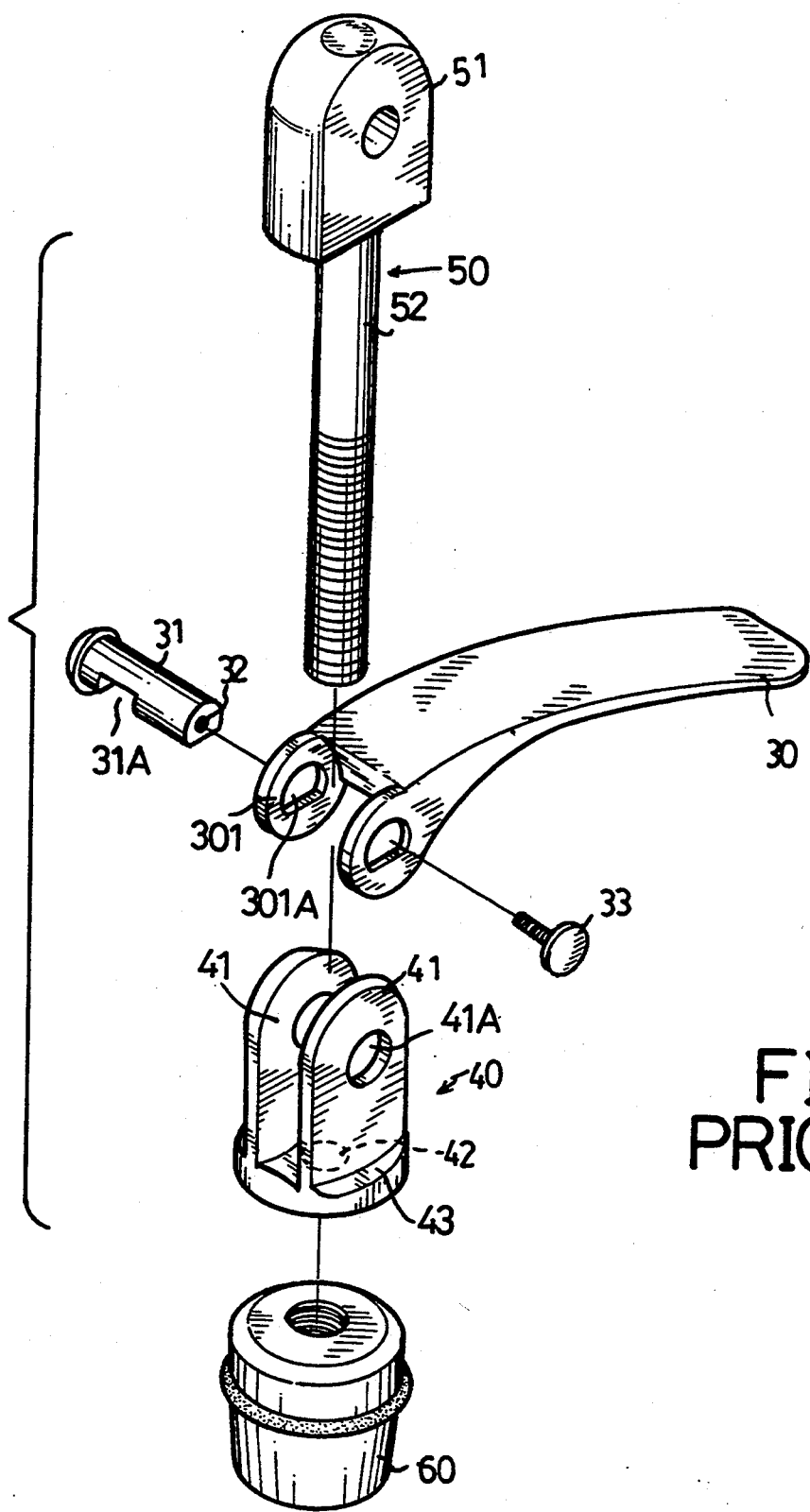
FIG. 5 is an exploded view of a conventional quick release.

Referring to FIGS. 1 and 5, the quick release clamp as shown in FIG. 1 is similar to that shown in FIG. 5. Particularly referring to FIG. 1, a quick release clamp in accordance with the present invention comprises a handle 20 which has two ears 201 extending from one end thereof and having a predetermined distance between the two ears 201. Each ear 201 has a hole 201A substantially "D" shaped. The handle 20 has a hole formed at substantially a central portion thereof for decreasing the weight of the handle 20. The handle 20 further has a protrusion 22 formed around a portion of the hole 21 for increasing the rigidity of the handle 20. A bracket 10 is formed as a U-shaped structure having a base 17 and two plates 14 perpendicularly extending from the base 17. A hole 16 is formed at the center of the base 17. Each perpendicular plate 14 has a hole 15 formed therethrough and the two holes 15 are in alignment with each other. A bolt means 50 has a head 51 and a rod 52 extending therefrom. The head 51 has a transverse hole 51A which has a first length. The rod 52 is threaded at a lower portion thereof. The head 51 of the bolt means 50 is appropriately sized to be positioned between the two plates 14. It should be noted that the two plates 14 will not clamp the head 51 when the rod 52 is positioned through the central hole 16 of the base 17. A pin 31 which is sectionally D-shaped is appropriately sized to mate with the two holes 201A of the two ears 201. The handle 20 is pivotally fixed on the bracket 10 by means of the pin 31. It should be noted that the transverse hole 51A of the bolt means 50, the holes 201A of the handle 20, and the holes 15 of the bracket 10 are appropriately sized such that they are allowed to be engaged in alignment with each other by means of the pin 31. The pin 31 has a recess 31A formed in a middle portion thereof which has a longitudinal length substantially greater than the first length of the hole 51A of the head portion 51 of the bolt means 50. The recess 31A is appropriately sized such that it can receive an outer and inner peripheral portion of the transverse hole 51A of the bolt means 50, yet not intersect with the holes 15 of the bracket 10. The pin 31 is longitudinally formed with a threaded hole 32 allowing a screw 33 to be firmly received therein. A threaded nut 60 is engaged to the lower portion of the rod 52 of the bolt means 50.

Figure 4:
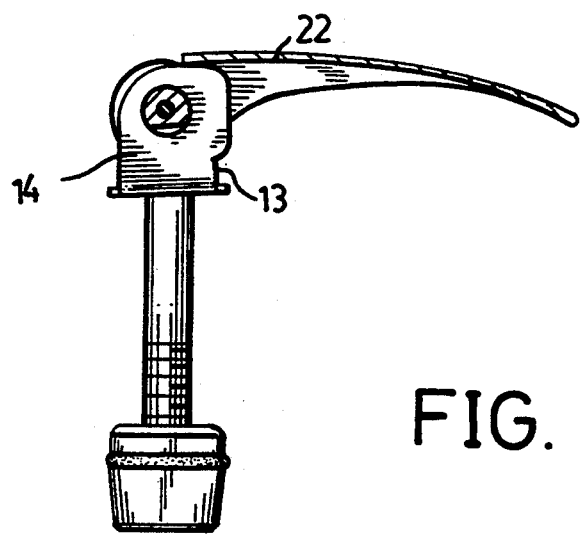
FIG. 4 is a partial sectional view of the quick release clamp taken from the line 4—4 of FIG. 3.
Figure 3:
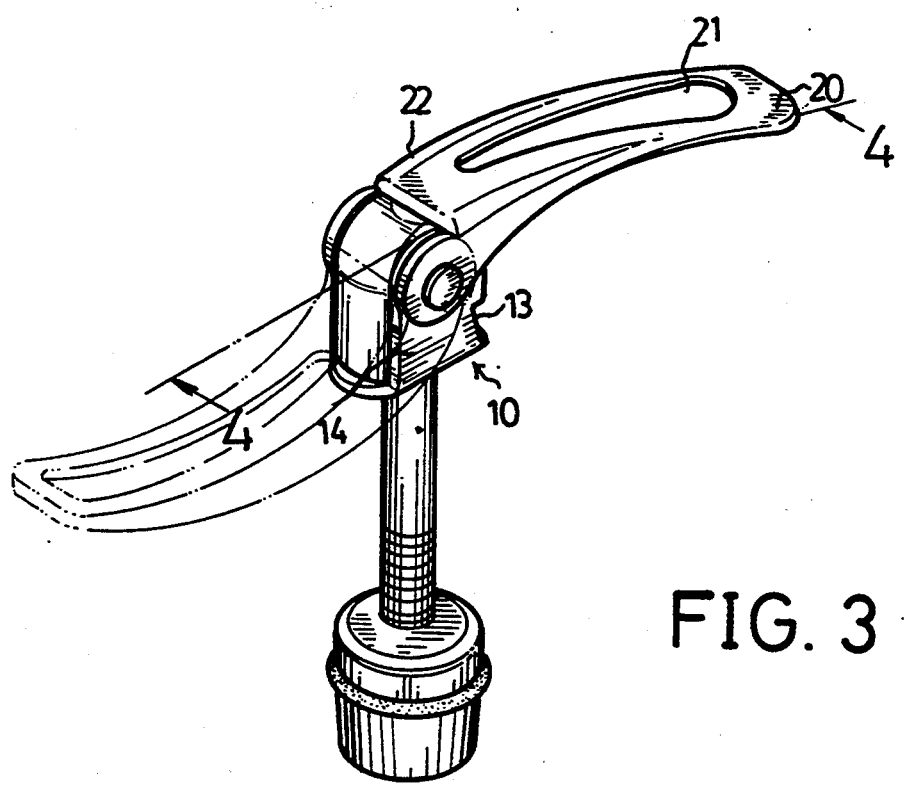
FIG. 3 is an assembled perspective view of the quick release clamp of FIG. 1.

The quick release clamp is operable in two modes which are a "locked" mode and an "unlocked" mode. The assembled structure of the quick release clamp is illustrated in FIG. 3. Referring to FIG. 4, the quick release clamp is in the "locked" mode, where the recess 31A is faced downward to receive a lower periphery portion of the hole 51A thus a first distance between the bottom surface of the base 17 and the top portion of the nut 60 is defined. When the quick release clamp is in the "locked" mode, an object such as a tube or the like is firmly clamped between the bottom of the bracket 10 and the top portion of the nut 60. If the handle 20 is pivoted 180° as shown in the phantom line portion of FIG. 3, then the quick release clamp is changed to the "unlocked" mode. If the user immediately lifts the bracket 10 causing the recess 31A of the pin 31 to receive an upper peripheral portion of the hole 51A, thus a second distance between the bottom of the bracket 10 and the top portion of the nut 60 is defined. It is obvious that the second distance is greater than the first distance, thus the object originally firmly clamped between the bracket 10 and the nut 60 is released, thereby enabling the user to release the object from the quick release clamp easily.

Figure 2:
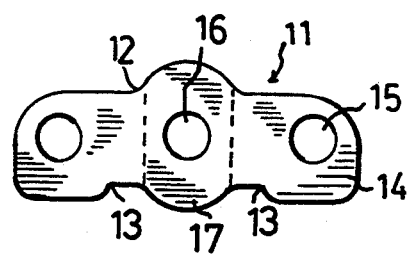
FIG. 2 illustrates the bracket means of the present invention before it is bent to a U-shaped structure.

The most significant improvement of the present invention focuses on the bracket 10. Referring to FIGS. 1 and 2, the bracket 10 is originally made from a plate 11 which has a central base 17 and two wings 14 extending from the base 17. The bracket 10 is obtained by bending the two wings 14 perpendicularly from two phantom lines 12. There is a cutout 13 at each wing 14 for easing the bending of the wing 14. It should be noted that the two wings 14 are called "perpendicular plates" when they are bent perpendicularly from the base 17 thus constituting a portion of the bracket 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A quick release clamp comprising:

a handle (20) which has two ears (201, 210) extending from one end thereof having a first distance therebetween, each said ear (201) having a hole (201A) horizontally extending therethrough which is substantially "D" shaped in section, a slot (21) vertically extending through a central portion of said handle (20) for decreasing the weight of said handle (20), a protrusion (22) formed on said handle (20) around a portion of said slot (21) for increasing rigidity of said handle (20);

a bracket (10) having a "U" shaped structure which is obtained by perpendicularly bending a plate (11) from two imaginary lines (12) thereof thus forming a base (17) and two vertical plates (14) integrally extending upwardly from said base (17), a central hole (16) vertically extending through a center of said base (17), each said vertical plate (14) defining a transverse hole (15) in alignment with each other;

a bolt means (50) comprising a head (51) and a rod (52) extending therefrom, said head (51) defining a transverse hole (51A) having a first length in a longitudinal direction thereof, said rod (52) being threaded at a lower portion thereof, said head (51) of said bolt (50) being slidably received between said two vertical plates (14), said rod (52) being positioned through said central hole (16) of said base (17);

a pin (31) which is substantially "D" shaped in section being firmly received by said two holes (201A) of said ears (201) and having a recess (31A) defined in a middle portion thereof which receives a peripheral wall portion of said transverse hole (51A) of said head (51) of said bolt means (50); and a nut (60) for engaging with said rod (52);

whereby said handle (20) is pivotally fixed on said bracket (10) by means of said pin (31), said pin (31) being rotatable in concert with said handle (20), said quick release clamp being in a locked mode when said recess (31A) is operated to receive a lower peripheral wall portion of said transverse hole (51A) of said bolt means (50), said quick release clamp being in an unlocked mode when said recess (31A) is operated to receive an upper peripheral wall portion of said transverse hole (51A) of said bolt means (50).

2. The quick release clamp of claim 1, wherein said slot (21) has an elongated shape extending along a length of the handle (20).

3. The quick release clamp of claim 2, wherein said protrusion (22) extends around a portion of said slot (21) adjacent said one end of said handle (20).

4. The quick release clamp of claim 3, wherein said protrusion (22) comprises a section of the handle (20) of increased thickness to increase the rigidity of the handle at said one end.

* * * * *